Oct. 19, 1943.   G. VON PAZSICZKY ET AL   2,331,946
MANUFACTURE OF GLASS FIBERS
Filed Aug. 5, 1939
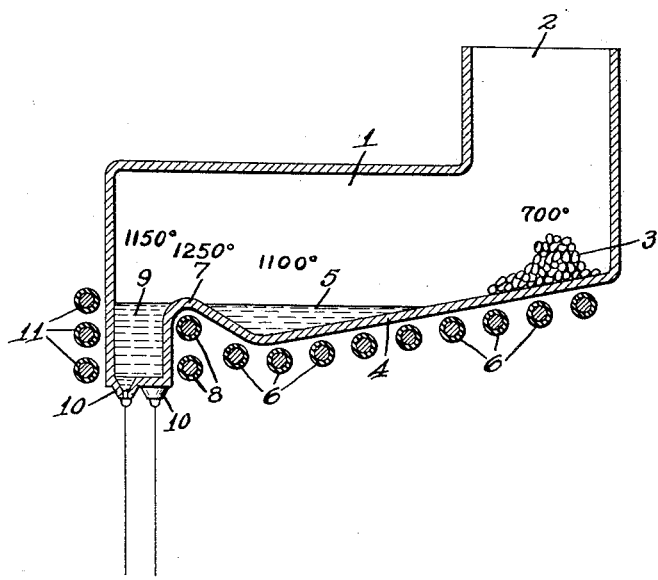
INVENTOR
GEDEON VON PAZSICZKY
BY
ATTORNEY Patented Oct. 19, 1943

2,331,946

UNITED STATES PATENT OFFICE 2,331,946

MANUFACTURE OF GLASS FIBERS

Gedeon von Pazsiczky, Hamburg-Wandsbek, Germany; vested in the Alien Property Custodian Application August 5, 1939, Serial No. 288,563
In Germany August 8, 1938

2 Claims. (Cl. 49—77)

In the manufacture of glass fibers by the continuous drawing process with which the molten glass is drawn at high speed through spinning orifices of the lower portion of a melting furnace, it has been proposed to use a high shaft-like melting furnace for obtaining above the spinning orifices a column of molten glass of great height and a correspondingly high static pressure. It has been found that furnaces of this kind are unsatisfactory for the production of glass fibers of great fineness, because with a column of glass of such great depth it was not possible to maintain the proper spinning temperature and further because the supply of cold cullet or the like entailed the formation of eddies and streaks in the glass mass and resultant zones of unequal temperatures and compositions. These factors, of course, injuriously affect the production of glass fibers of minute diameter, for example of less than 8 to 6 microns, since the furnaces used for the manufacture of fibrous glass are usually of very small dimensions, the same having generally only a small base of much less than one square meter. With such furnaces variations in the composition, temperature and degree of liquidity of the molten glass mass have a very serious effect on the production of glass fibers of great fineness. The filaments frequently break or become too coarse so that they cannot be used for textile purposes.

It is the object of the present invention to overcome these drawbacks, to which end the raw glass material is introduced into a melting receptacle at one end thereof, subjected to heat and the whole caused to flow in a horizontal direction through a melting compartment and from the same over a heated dam into a relatively small spinning compartment, in which the molten and fined glass is kept at a uniform temperature and level and from which it is drawn through spinning orifices or nozzles. The dam is preferably heated to a temperature higher than that of the spinning compartment and the melting compartment.

An apparatus for carrying out this method comprises a melting receptacle having a melting compartment proper extending in horizontal direction from a charging opening on to a dam with its bottom heatable and preferably slightly inclined towards the dam, the melting compartment communicating by overflow across the dam with a comparatively small, for example trough-like spinning compartment which has in its lower or lateral portions spinning openings for the drawing of the glass to fibers or filaments. This spinning compartment extends vertically to the direction of the flow of the batch in the melting compartment and parallelly to the dam. In a preferred embodiment, the dam is provided with heating means which may be wholly of the electric type.

On the accompanying drawing one form of apparatus according to the invention is illustrated, by way of example, in a vertical longitudinal section.

Referring to the drawing, 1 denotes a melting receptacle made of refractory material, heat-resisting metal alloys or the like and provided at one of its ends with a charging opening 2 for the introduction of the raw material to be melted. The receptacle 1 has a melting compartment 5 with an inclined bottom 4 on which a small heap of raw material 3 accumulates below the charging opening, as illustrated. The melting compartment is heated by means of electrical heaters 6 or other suitable heating devices. At the end opposite the charging opening 2 the melting compartment 5 is bordered by a dam or weir 7 which is also adapted to be heated, for example by electrical heaters 8. Joining the dam 7 is a spinning compartment 9 provided in its bottom with spinning nozzles 10 of known form and adapted to be heated by heaters 11. In the embodiment illustrated, the spinning compartment has two rows of nozzles 10. Each row may include any desired number of nozzles and there may also be provided more than two rows beside one another.

As will be seen from the drawing, the spinning compartment 9 which is in the shape of a trough in the embodiment illustrated is very small in comparison with the melting compartment 5.

The heaters 6, 8 and 11 may consist of electric resistors in the form of wires, rods or the like preferably enclosed in suitable refractory pipes. Instead of electricity there may also be used gas, oil burners or the like for heating the various parts of the receptacle. Preferably the heating is so controlled that the dam 7 possesses the highest temperature. However, the control may also be so that the spinning nozzles 10 have the highest temperature. In the latter case the temperature of the glass on its way from the charging opening 2 is gradually raised, for example in the melting compartment 5 to a temperature from about 700° C. to 1000° C., then at or near the dam 7 for example to 1100° C., in the spinning compartment 9 for example to 1150° C. and finally in the spinning nozzles 10 to 1250° C. If the method is carried out in a manner to give the dam 7 the highest temperature, it may be heated to about 1250° C. and, as in the foregoing example, the melting compartment may be from 700° to 1000° C. and the spinning compartment at about 1150° C.

When the melting receptacle 1 is supplied through the opening 2 with cullet or other batch material same is melted by the action of the heaters 6, the molten mass flows into the melting compartment 5 where melting and fining continues and where the mass accumulates until it flows over the dam 7. As the glass flows over the dam 7 in a thin layer and this dam is kept at a high temperature the glass undergoes another refining and acquires a high uniform degree of liquidity. Temperatures at this point may be so that the glass flowing over the dam 7 into the spinning compartment 9 is hotter than the glass already contained in the latter so that there is no sinking down of streaks but the mass fed into the spinning compartment as a whole gradually sinks down therein in accordance with the delivery of the molten glass through the spinning nozzles 10.

Due to the narrow trough-like shape and the small size of the spinning compartment which is heated from all sides, the glass does not remain in this compartment long enough to devitrify and is delivered through the nozzles 10 in a uniform composition with uniform temperature and liquidity, whereby even with a low level of the liquid mass in the compartment 9 a continuous undisturbed spinning or drawing of filaments of greatest fineness is rendered possible and breaking of the filaments is reduced to a minimum.

With the apparatus described the pressure of the liquid mass or static pressure over all nozzles is equal and comparatively small so that the glass filaments are practically only under the tractive force of the drawing means, which may for instance consist of a winding drum (not shown). Undesirable formation of knots or thickened lengths of filaments as are often found in the use of shaft furnaces with a high column of glass, does not occur with the present method.

The dam 7 also acts to retain unmolten pieces of glass and prevent them from entering the spinning compartment 9 so that the latter always receives and contains only well refined glass which is free from seeds and bubbles.

Modifications may be resorted to within the spirit and scope of the appended claims.

Having thus described my invention, what I claim as new and desire to secure by Letters Patent is:

1. A method of manufacturing fibers from molten glass comprising introducing raw glass material into a melting receptacle at one end thereof and supporting the material above the normal level of glass in said receptacle, subjecting the material to heat for melting it and causing it to flow under the influence of gravity in a thin layer in a substantially horizontal direction through a melting compartment and into a pool of molten glass in said compartment, controlling the temperature of the latter so that the temperature of the molten glass is raised progressively as it flows therethrough, flowing the melted glass from said pool in the melting compartment in a thin layer over a heated dam into a comparatively small spinning compartment, raising the temperature of the molten glass as it flows over said dam, maintaining the molten glass in the spinning compartment at a substantially constant level and at a temperature higher than the highest temperature in the melting compartment and lower than the temperature of the glass as it flows over the dam, and flowing the molten glass downwardly from the spinning compartment through spinning orifices.

2. A method of melting glass in the manufacture of fibers from molten glass comprising, introducing raw glass material into a melting receptacle at one end thereof and supporting the material in a position above the normal level of molten glass in said receptacle, subjecting the material to heat for melting it and causing it to flow under the influence of gravity in a thin layer in a substantially horizontal direction through a melting compartment and into a pool of molten glass in said compartment, progressively increasing the temperature of the molten glass as it flows through the melting compartment, flowing the melted glass from the pool in said melting compartment in a thin layer over a heated dam into a comparatively small spinning compartment from which the glass is fed downwardly to be formed into fibers, raising the temperature of the molten glass as it flows over said dam, and maintaining the molten glass in the spinning compartment at a substantially constant level and at a temperature lower than that of the glass as it flows over the dam.

GEDEON von PAZSICZKY.